US012774393B2

(12) United States Patent
Hicks

(10) Patent No.: US 12,774,393 B2
(45) Date of Patent: Oct. 27, 2026

(54) SLIP-RESISTANT COMPOSITIONS WITH OPTICAL WEAR INDICATION

(71) Applicant: Cavana Holdings, LLC, Sheldon, SC (US)

(72) Inventor: Steven W. Hicks, Corcoran, MN (US)

(73) Assignee: Cavana Holdings, LLC, Sheldon, SC (US)

( * ) Notice: Subject to any disclaimer, the term of this patent is extended or adjusted under 35 U.S.C. 154(b) by 34 days.

(21) Appl. No.: 18/501,560

(22) Filed: Nov. 3, 2023

(65) Prior Publication Data

US 2024/0150591 A1 May 9, 2024

Related U.S. Application Data

(60) Provisional application No. 63/422,290, filed on Nov. 3, 2022.

(51) Int. Cl.

| | |
|---|---|
| ***G01N 21/64*** | (2006.01) |
| ***C04B 41/00*** | (2006.01) |
| ***C04B 41/45*** | (2006.01) |
| ***C04B 41/48*** | (2006.01) |
| ***C04B 41/63*** | (2006.01) |
| ***C09D 5/22*** | (2006.01) |
| ***C09D 7/40*** | (2018.01) |

(Continued)

(52) U.S. Cl.
CPC .............. *C09D 5/22* (2013.01); *C04B 41/009* (2013.01); *C04B 41/4539* (2013.01); *C04B 41/483* (2013.01); *C04B 41/63* (2013.01); *C09D 7/62* (2018.01); *C09D 7/69* (2018.01); *C09D 133/04* (2013.01); *C09K 3/149* (2013.01); *G01N 21/64* (2013.01)

(58) Field of Classification Search
CPC ... C09D 5/22; C09D 7/62; C09D 7/69; C09D 133/04; C04B 41/009; C04B 41/4539; C04B 41/483; C04B 41/63; C09K 3/149; C09K 11/02; C09K 11/565; G01N 21/64; G01N 21/6408
See application file for complete search history.

(56) References Cited

U.S. PATENT DOCUMENTS 4,968,892 A * 11/1990 McAtee ................ G01N 21/91
250/458.1
5,431,960 A 7/1995 Watts
(Continued)

FOREIGN PATENT DOCUMENTS

CN 102765894 A 11/2012
CN 108753050 A 11/2018
(Continued)

*Primary Examiner* — Freddie Kirkland, III
(74) *Attorney, Agent, or Firm* — Christensen, Fonder, Dardi & Busse PLLC; John P. Fonder

(57) ABSTRACT

A luminescent slip-resistant composition for use on concrete surfaces. The composition includes a plurality of luminescent granules including a base granular material that comprises one or more of silica, aluminum oxide and a granular polymer material, each granule coated with a luminescent material, an average size of the plurality of luminescent granules being in a range of 2 μm to 2,000 μm; and a liquid sealer. The plurality of luminescent granules are mixed into the liquid sealer to form the composition in a ratio of 2 ounces to 200 ounces of luminescent granules to one gallon of liquid sealer.

10 Claims, 3 Drawing Sheets

(51) Int. Cl.

| | |
|---|---|
| ***C09D 7/62*** | (2018.01) |
| ***C09D 133/04*** | (2006.01) |
| ***C09K 3/14*** | (2006.01) |

(56) References Cited

U.S. PATENT DOCUMENTS

| | | | | |
|---|---|---|---|---|
| 5,849,218 | A | 12/1998 | Johansen, Jr. et al. | |
| 6,632,401 | B1 * | 10/2003 | Wulf | G01N 21/643 422/82.08 |
| 7,340,093 | B2 * | 3/2008 | Yamamichi | G06V 20/69 382/172 |
| 10,082,387 | B2 * | 9/2018 | Bergren | G01N 21/91 |
| 10,480,935 | B2 * | 11/2019 | Rupnowski | G01B 11/0633 |
| 11,186,524 | B2 * | 11/2021 | Saleem | C04B 41/68 |
| 12,140,526 | B2 * | 11/2024 | Livingston | G01N 33/54313 |
| 2004/0146349 | A1 * | 7/2004 | Saito | C09D 5/004 404/14 |
| 2005/0220342 | A1 * | 10/2005 | Yamamichi | G06V 20/69 382/128 |
| 2006/0035079 | A1 * | 2/2006 | Xu | C09K 11/7734 252/301.36 |
| 2008/0249207 | A1 | 10/2008 | Whiteley et al. | |
| 2009/0022979 | A1 | 1/2009 | Tsai | |
| 2010/0127613 | A1 * | 5/2010 | Collins | C09K 11/77347 313/503 |
| 2017/0261313 | A1 * | 9/2017 | Bergren | G01B 11/22 |
| 2022/0048829 | A1 * | 2/2022 | Saleem | C09K 11/02 |
| 2025/0231116 | A1 * | 7/2025 | Oowada | G01N 21/9501 |

FOREIGN PATENT DOCUMENTS

| | | | |
|---|---|---|---|
| EP | 2 774 965 | A1 | 9/2014 |
| WO | WO 03/089382 | A1 | 10/2003 |

* cited by examiner

SLIP-RESISTANT COMPOSITIONS WITH OPTICAL WEAR INDICATION

CROSS-REFERENCE TO RELATED APPLICATIONS

This application claims the benefit of U.S. Provisional Patent Application No. 63/422,290, filed Nov. 3, 2022, which is incorporated herein in its entirety.

FIELD OF THE INVENTION

The invention relates to slip-resistant compositions with visible, luminous wear indicators, and methods, systems and devices for visibly determining slip-resistance properties.

BACKGROUND

Surfaces, and particularly concrete surfaces, around and in the vicinity of pools, splash pads, water parks, and similar water-recreation areas get wet and can become slippery, posing a slip hazard to persons traversing these wet surfaces. To reduce the possibility of slip-and-fall accidents, facility owners and contractors may treat the concrete surface in an effort to increase the coefficient of friction between a person's foot and the surface, thereby making the surface more slip resistant. For example, gritty materials, such as silica sand, aluminum oxide, or polymer particles may be applied to the concrete surface while the concrete is still plastic, or may be applied to the concrete surface as part of a liquid coating which dries and forms a rough, gritty surface.

While adding coatings with grit material to concrete surfaces does indeed improve the slip-resistant properties of the surfaces, over time, and with use, the coatings and materials will be worn away, requiring reapplication, and particularly in areas that receive relatively more foot traffic, such as walkways, entrances, and so on.

Consequently, to maintain the safety of wetted concrete surfaces, the surfaces must be regularly recoated and grit material reapplied. However, it can be challenging to determine when it is time to reapply or re-treat as some areas may wear sooner than others, and because erosion or wear of the coatings can be difficult to perceive, let alone measure.

A number of standards and tests for determining and measuring slip resistant properties of floor, such as the "pendulum test," the "ramp test", and so on are known. However, not only is such testing not user friendly, and potentially costly, but its success depends on measuring and identifying those areas that may have worn more than others—a feat which may be difficult when an area includes a variety of walkways, passages, entrances, and so on.

SUMMARY

Embodiments of the disclosure provide compositions, systems and methods for improving, identifying and measuring slip-resistance properties of a floor surface, and particularly concrete surfaces, though the use of luminous materials.

More particularly, embodiments of the present disclosure include a slip-resistant composition for a surface, such as a concrete surface, that includes a sealer or coating material having a grit material such as aluminum oxide or other granules. In an embodiment, the granules are luminescent, and may emit light via fluorescence, phosphorescence, chemiluminescence, and so on. In an embodiment, the composition with sealer and luminous granules may be applied at the same time to a surface. In another embodiment, the sealer and luminous granules are applied separately. In one such embodiment, after application of the liquid sealer, the luminescent granules are distributed on the concrete surface, and are visible to a nearby observer. The emission of light from the coated concrete surface indicates the presence of the grit or granular material, and the degree of luminescence, which may be an intensity, provides an indication of a density of the granule material on the surface. In an embodiment, a higher degree of luminosity indicates a higher density of grit material on the surface, and increased slip resistance. Decreased luminosity may provide a visual indicator that reapplication of the sealant with the granules is needed to as to maintain or improve slip-resistant properties.

Embodiments of the present invention also include methods of determining slip-resistant properties of a treated or sealed concrete surface, as well as methods of determining relative changes of slip-resistant properties. In one embodiment, the method includes preparing a concrete surface, applying a sealer and luminescent slip resistant material to the concrete surface, measuring an initial luminescence of areas of the coated surface, exposing the concrete surface to wear activities, subsequently measuring luminance of the areas of the coated surface, and determining a change in luminance of the areas. Other embodiments include comparing luminance of one portion of an area, such as a high-traffic area, to another portion of the area, at approximately the same point in time, to determine a difference in luminance, which indicates a relative difference in wear or deterioration of the luminescent slip-resistant compound.

BRIEF DESCRIPTION OF THE DRAWINGS

The present invention will become more fully understood from the detailed description given herein below for illustration only, and thus not limitative of the present invention, wherein.

Figure 1:
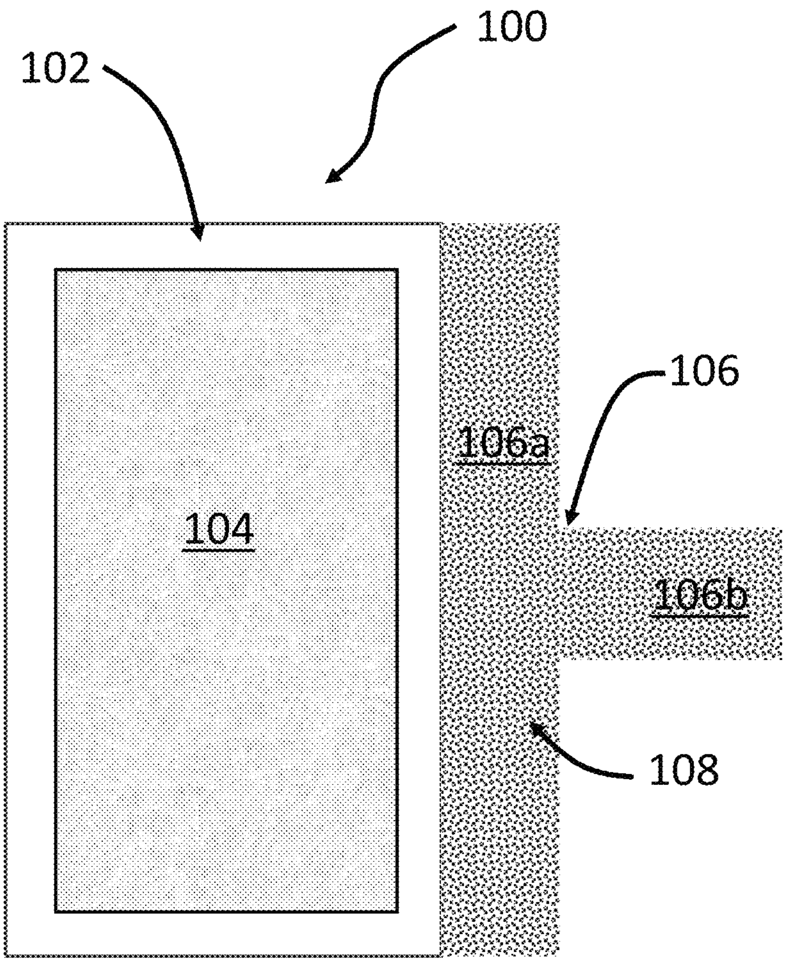
FIG. 1 is a plan view of a pool area with nearby concrete surface areas treated with luminescent slip-resistant composition, according to an embodiment of the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Referring to FIG. 1, vicinity 100 includes water-containing structure ("pool") 102 with water 104 and surface area 106 treated with luminescent slip-resistant composition 108.

Pool 102 may form a basin for holding water 104, such as a swimming pool. In some embodiments, pool 102 may contain still or non-flowing water 104, but in other embodiments, may form or be part of a structure for flowing water, such as a water channel, water slide, decorative fountain, or other similar water-containing structure, including those that may be found at water-based recreational facilities, such as swimming pools, water parks, water slides, and so on. Therefore, it will be understood that the term "pool" is broadly meant to include various water-containing structures.

Surface area 106 as depicted includes first surface area 106*a* which includes an area extending along one side of, and directly adjacent to, pool 102, and second surface area 106*b* which as depicted comprises a walkway connected to first surface area 106*a* and leading to pool 102. In an embodiment, first and second surface areas 106*a*, 106*b* are surface areas intended to be walked upon by a person in vicinity 100. In embodiments, some water 104 from pool 102 may reside on surface area 106. In this embodiment, surface area 106 is depicted as relatively flat, such as a flat walkway or sidewalk, but it will be understood that surface area 106 is not limited to flat areas, and may include stairs and other structures that may comprise combinations of contoured, concave, and convex surfaces.

In the embodiment depicted, luminescent slip-resistant composition 108 has been applied to surface area 106, including to first surface area 106*a* and second surface area 106*b*.

In an embodiment, luminescent slip-resistant composition 108 may comprise a liquid sealer component and a plurality of luminescent grit material or granules. The granules may be mixed into the liquid sealer prior to application to surface area 106, or in another embodiment, the granules may be distributed onto a layer of the liquid sealer after the sealer is applied to surface 106.

In an embodiment, the sealer is a topical acrylic sealer which helps protect the base material forming surface area 106 from staining, helps in promoting surface drainage by creating a "film" on the surface which reduces tension and helps move the water along. The sealer also prevents the intrusion of water which leads to freeze thaw damage due to expanding water inside of the concrete itself. Other types of film-forming sealers may include polyurethane and epoxy.

The luminescent granules may include a base granular material such as silica, aluminum oxide, a granular polymer material, such as polymeric grit, polystyrene beads, and so on. Non-luminescent granular material in a floor coating is described in U.S. Pat. No. 5,431,960 to Watts, entitled "Anti-Slip Floor Coating Composition" issued Jul. 11, 1995, which is incorporated herein by reference in its entirety. Anti-slip coatings with granular materials are also described in U.S. Patent Pub. No. 2008/0249207A1 to Whitely et al., entitled "Safety Coatings," published Oct. 9, 2008, which describes anti-slip coating compositions with polymeric materials, and U.S. Patent Pub. No. 2009/0022979 to Tsai, entitled "Anti-Slip Floor Coating Composition and Anti-Slip Floor Material Made Therefrom," published Jan. 22, 2009, which describes an anti-slip floor coating with particles, both of which are herein incorporated by reference in its entirety.

In an embodiment, the base granular material is coated with a luminescent or light-transmitting material, such as fluorescent or phosphorescent materials, that may comprise various coatings, resins, pigments or other such materials. In an embodiment, the luminescent or light-transmitting material may include sulfide compositions, such as zinc sulfide, alkaline rare earth elements, doped or undoped strontium aluminate, metals such as calcium, strontium, barium and magnesium, or oxides such as silicon dioxide, sulfur dioxide, or neodymium oxide. Embodiments of the luminescent coating may be inorganic or organic.

In an embodiment, luminescent slip-resistant composition 108 includes a plurality of luminescent granules or particles, wherein an average granule size of the plurality of luminescent granules is in a range of 2 μm (microns) to 2,000 microns. In other words, an embodiment of luminescent slip-resistant composition 108 with relatively small granules may include luminescent granules having an average particle size of 2 microns, and an embodiment of luminescent slip-resistant composition 108 with relatively large granules may include luminescent granules having an average particle size of 2,000 microns. Large granule size may improve overall slip resistance, but may be uncomfortable to bare feet. In an embodiment that balances slip resistance and comfort, an average luminescent granule size of the plurality of luminescent granules is 500 microns. In such an embodiment, the actual granule size of each granule may vary from 500 microns, but on average is substantially 500 microns. The luminescent granules are configured to emit light based on various physical, optical and chemical means, including, but not limited to, phosphorescence, fluorescence and/or chemiluminescence. In an embodiment, the luminescent granules comprise phosphorescent polymeric grit that emits light or glows after sustained exposure to ultraviolet (UV) light.

The brightness or luminance of the luminescent material used to coat the non-slip granules may vary depending on multiple factors, such as material composition selected, desired initial or expected future brightness, environmental conditions, and so on. In an embodiment, the luminance of the luminous material may be in a range of 4,000 to 8,000 mcd/m$^2$ (millicandelas per square meter) at 1 minute, 600-1,200 mcd/m$^2$ at 30 minutes and 100-300 mcd/m$^2$ at 1 hour. In one embodiment, luminance of the luminescent material and luminescent granules is 6080 mcd/m$^2$ at 1 minute, 981 mcd/m$^2$ at 30 minutes and 220 mcd/m2 at 1 hour.

Some luminescent pool coatings are known, such as those described in U.S. Pat. No. 5,849,218 to Johansen, Jr., entitled "Fluorescent Pool Coating," issued Dec. 15, 1998 which describes water insoluble coatings for water retention structures to provide a decorative glowing effect when illuminated with UV or infrared lighting, and which is incorporated herein by reference in its entirety. Luminous cement-based compositions are also known, such as those described in International Publication No. WO 03/089382 to Katco Corporation, entitled "Luminous Cementitious Composition and Methods of Making and Using the Same." However, luminous compositions for slip resistance and for determining degrees of slip resistance are not known.

As described above, luminescent slip-resistant composition 108 includes a plurality of luminescent granules, such as a phosphorescent grit, immersed in a liquid sealer. An amount of luminescent granules by weight for a given volume of liquid sealer may vary from application to application. Higher amounts of luminescent granules per volume of liquid sealer increases both slip resistance and luminescence. Consequently, for high-traffic areas where increased slip resistance and/or increased luminescence may be desirable, a higher ratio of granules to sealer may be used. In an embodiment, luminescent slip-resistant composition 108 comprises 2 ounces to 200 ounces, by weight, of luminescent granules may be mixed with one gallon of liquid sealer. In other words, a ratio of luminescent granules to liquid sealer is in a range of 2 ounces/gallon to 200 ounces/gallon. In another embodiment, luminescent slip-resistant composition 108 comprises 50 ounces to 100 ounces, by weight, of luminescent granules for each one gallon of liquid sealer. In other words, a ratio of luminescent granules to liquid sealer is in a range of 50 ounces/gallon to 100 ounces/gallon. In another embodiment, luminescent slip-resistant composition 108 comprises ounces to 50 ounces, by weight, of luminescent granules for each one gallon of liquid sealer.

Figure 2:
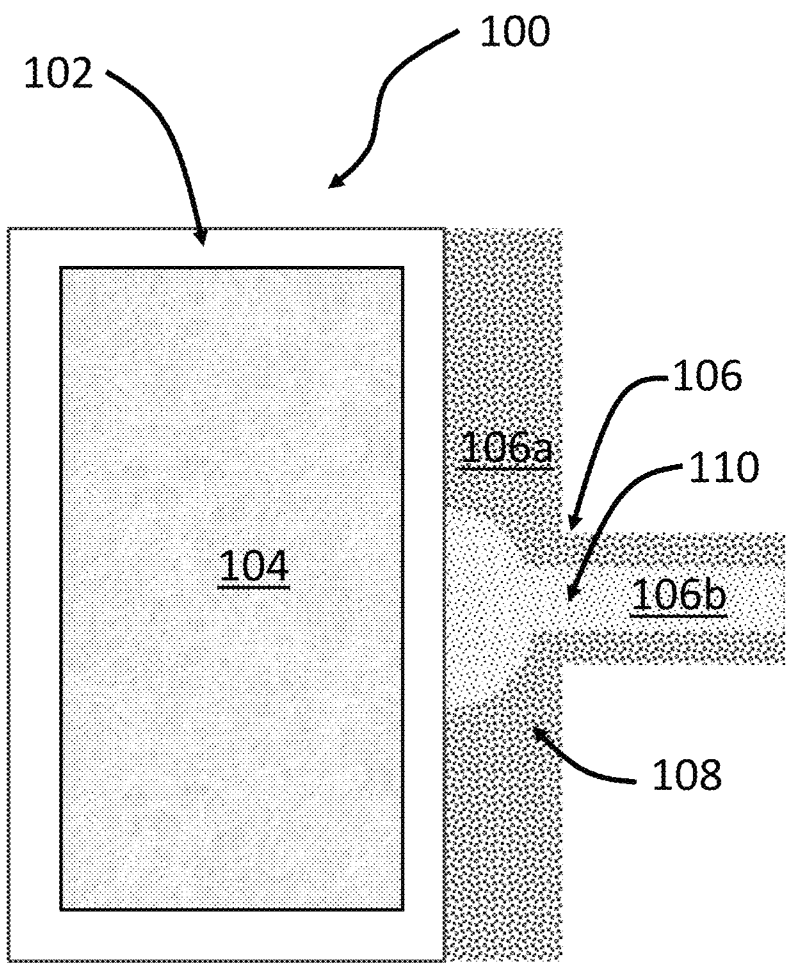
FIG. 2 is a plan view of the pool area of FIG. 1 after use resulting in wear and erosion of certain areas previously treated for improved slip resistance, according to an embodiment of the disclosure.

Referring to FIG. 2, vicinity 100 of FIG. 1 is depicted, along with pool 102 having water 104, and surface area 106 with luminous slip-resistant composition 108 applied. However, in FIG. 2, surface area 106, including areas 106*a*, 106*b* have been subjected to wear, such that the applied composition 108 has worn away at worn surface area 110. Worn surface area 110 includes a portion of first surface area 106*a* and a portion of second surface area. In this embodiment, worn surface area 110 includes areas along a center of second surface area 106*b*, which may be a walkway leading to pool 102, and a portion of 106*a* directly adjacent to pool 102 where persons have frequently approached and entered pool 102.

In worn surface area 110, portions of luminous slip-resistant composition 108 have worn away through abrasive contact due to being walked on over time. The amount of wear, or amount of material removed, depends on many factors, including the frequency of persons walking on coated area 106, the type of footwear worn by those persons, whether objects other than persons have contacted area 106, exposure to sunlight or other environmental elements, the amount of time that has passed since initial application, and so on.

Due to removal of luminous slip-resistant composition 108 from surface area 106, resulting in worn surface area 110, the worn areas of surface area 106 (worn surface area 110) as compared to the non-worn portions of surface area 106, will have less slip resistance, i.e., will be more slippery, and exhibit lower coefficients of friction.

As will be explained in further detail below with respect to FIG. 3, because luminous slip-resistant composition 108 emits light, a user, such as a facilities manager or other responsible person, is able to quickly and visually distinguish worn surface area 110 from non-worn surface areas of surface area 106. In other words, the luminous slip-resistant composition acts as an optical indicator of slip resistance, which can be defined in various ways, including as a coefficient of friction. As compared to constantly testing various test points around surface area 106, the user can easily identify wear areas and patterns and quickly determine whether to reapply composition 108 and where to reapply.

Further, a user may also identify differences in luminance over time for a particular surface area. For example, an initial luminance may be relatively high for a particular area when first treated or coated. After a period of time, luminance of the same surface area may be diminished due to the wear described above. As such, a comparison of luminance over time for a same area may be conducted by a user to determine relative wear or deterioration of luminous slip-resistant composition applied to the surface area, as described further below.

Figure 3:
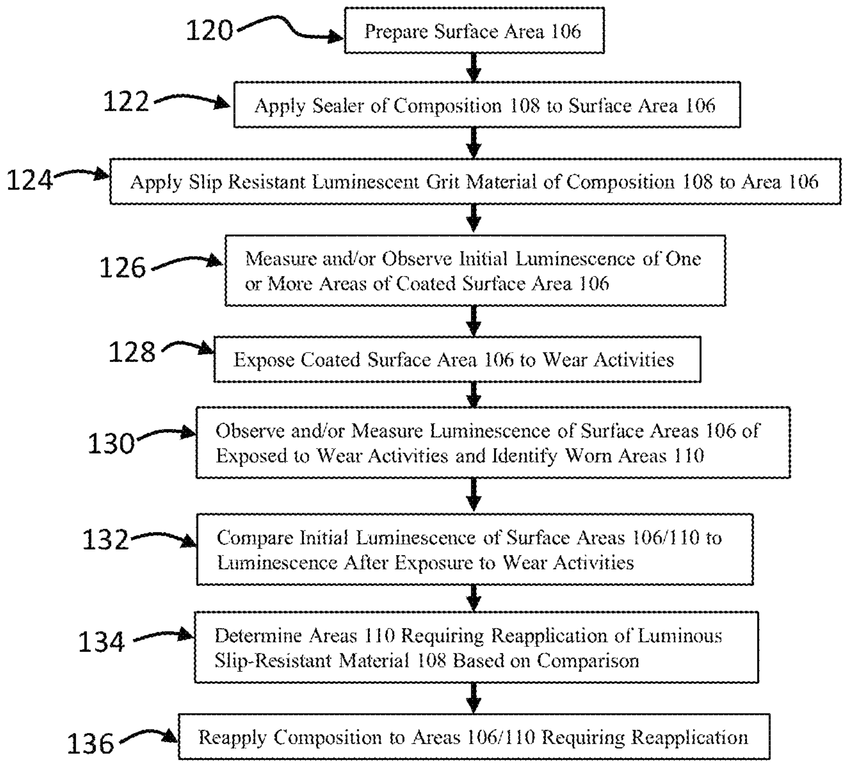
FIG. 3 is a flow chart depicting and describing a method of applying and determining slip resistant properties based on luminous characteristics of the treated surfaces.

Referring to FIG. 3, a flow chart depicts an embodiment of a method of determining whether a surface area in a vicinity of a water feature, such as a pool, requires reapplication of a slip-resistant material. In the embodiment depicted, the method includes one or more of the following steps:

Step 120: Prepare Substrate Surface 106;

Step 122: Apply Sealer of Composition 108 to Surface Area 106;

Step 124: Apply Slip Resistant Luminescent Material of Composition 108 to Area 106;

Step 126: Measure and/or Observe Initial Luminescence of One or More Areas of Coated Surface Area 106;

Step 128: Expose Coated Surface Area 106 to Wear Activities;

Step 130: Observe and/or Measure Luminescence of Surface Areas 106 of Exposed to Wear Activities and Identify Worn Areas 110;

Step 132: Compare Initial Luminescence of Surface Areas 106/110 to Luminescence After Exposure to Wear Activities;

Step 134: Determine Areas 110 Requiring Reapplication of Luminous Slip-Resistant Material 108 Based on Comparison; and Step 136: Reapply Composition to Areas 106/110 Requiring Reapplication.

At Step 120, surface area 106 may be prepared or treated to ensure that luminous slip-resistant composition 108 adheres to surface area 106.

At Steps 122 and 124, the sealer and grit material of luminous slip-resistant composition 108 may be applied as separate steps, or when the grit material is already in the sealer, may be applied in a single step.

Various amounts of luminous slip-resistant composition 108 may be applied for a particular surface area, depending at least in part on desired luminescence, slip resistance, and expected wear. For example, in a high-traffic area, a large amount of luminous slip-resistant composition 108 may be applied to a particular area, resulting in a thicker layer of compound 108 over the surface. In an embodiment, one gallon of luminous slip-resistant composition 108 may be applied to a surface area that is in a range of 100 square feet to 500 square feet. In another embodiment, one gallon of luminous slip-resistant composition 108 may be applied to a surface area that is in a range of 200 square feet to 300 square feet. In one such embodiment, one gallon is applied to approximately 300 square feet of surface area.

At Step 126, an initial luminescence of the luminescent slip-resistant composition on the surface area may be measured. Alternatively, simple observations by a user may be made, including observations that illumination from, or luminance of the applied luminous slip-resistant composition 108 is generally uniform. If measured, the initial luminance can be compared to luminance at a later point in time to determine a change in luminance as described further below. If luminance is not initially measured and/or observed, then after wear activities, portions of surface area 106 may be compared to determine if some portions of surface area 106 are worn more than others, indicating a need to reapply luminescent slip-resistant composition 108 onto surface 106 at worn area 110. Measurement of luminance may be conducted by various means, including use of a luminometer, photographic means, chemical means, or other means.

As described above, the luminous material used to cover or coat the base granule will have a known luminance, e.g., 6,080 mcd/m$^2$ at 1 minute. However, luminance of a treated surface area 106 will depend on a number of factors, including a concentration of luminescent granules to liquid sealer, coating thickness, and so on. Consequently, a measured luminance of a particular area may, but will not necessarily, match the rated luminance of the luminous material. However, embodiments of methods of determining wear or deterioration in slip-resistant properties of treated surfaces do not necessarily depend on specific luminance values, but rather, depend on changes in luminance over time for a same treated surface area, or relative differences in luminance between different portions of a treated surface area, e.g., worn vs. not worn.

At Step 128, surface area 106 with luminous slip-resistant composition 108 is exposed to wear activities, which may include persons walking on surface area 106, objects contacting surface area 106, and exposure to environmental conditions such as exposure to sunlight, moisture, and so on.

At Step 130, after initial coating or treatment of surface area 106, and after wear activities, luminescence of area 106 may be measured to compare to the initial luminescence, which is Step 132. Alternatively, portions of surface area 106 after wear activities may be compared with one another through measurement or observation of luminescence.

In an embodiment, a minimum luminance value for a surface area may be predetermined. Since luminance functions as a proxy for slip resistance, the minimum luminance value may be used to determine a minimum slip-resistant property. In other words, if a measured luminance of a particular surface area falls below the minimum luminance value, this indicates that the slip-resistance of the surface area is below an acceptable slip resistance for the surface, and the luminescent slip-resistant composition should be reapplied.

At Step 134, a determination based on measured or observed luminance is made. The determination may include determining which portions of surface area 106 require reapplication of luminous slip-resistant composition 108 by simple observation of differing levels of luminance of portions of surface area 106, and/or the determination may include determining which portions of surface area 106 should be tested for slip-resistance. In an embodiment, luminance of a particular portion of a previously treated surface is measured, then compared to an earlier or initial luminance, or to another predetermined luminance value, which may be the minimum value. In other embodiments, relative luminance between two separate and distinct portions of the treated surface area 106 are compared. In such an embodiment, a relative difference in luminance may be used to determine a degree of wear and whether to reapply the luminescent slip-resistant compound 108 to all or some portions of the surface 106.

In an embodiment, a first step is to identify areas of diminished luminescence based on observation or measurement of luminance, and a second step is to measure coefficients of friction based on known test methods, such as the "pendulum test," the combination of the two steps determining which areas should be treated.

At Step 136, luminous slip-resistant composition 108 is reapplied to those portions, which may be all portions, of surface area 106 that indicate decreased slip-resistance properties.

Although the above-described embodiments are generally directed to luminescent slip-resistant compositions and methods of determining wear or deterioration of luminescent slip-resistant compositions as applied to surface areas, other embodiments may be directed to other luminescent compositions that may be applied to structural surfaces and that may wear, deteriorate or degrade over time due to contact by persons, environmental conditions, or other such factors. Similarly, embodiments also include methods of detecting, determining and remedying deterioration of other luminescent compositions that may not be directed to non-slip applications.

In an embodiment, a luminescent composition 108 comprises the luminescent or light-transmitting material described above, as well as a liquid. In such an embodiment, the luminescent material may not be a coating on a granular material, but rather, may be a luminescent material immersed directly into the liquid of the composition 108. Alternatively, the luminescent material may be a coating on a particle that is not a "slip-resistant" granule, but rather is a substrate or carrier for the luminescent material.

Further, while the liquid may be a liquid sealer as described above, in embodiments, the liquid may alternatively comprise other types of liquids configured to form a coating over a surface, such as paint.

The methods of detecting wear and deterioration of luminescent slip-resistant compositions 108 also apply to luminescent compositions that may not necessary be slip-resistant compositions. For example, the methods above may be utilized to determine wear or deterioration of a paint-based luminescent composition that includes luminescent material immersed in liquid paint which is applied to a surface, such as a floor, wall, or other surface. Deterioration may be a result of human contact similar to the luminescent slip-resistant composition application, but may also be a result of environmental factors, such as UV, wind, rain and similar environmental exposure, or simply a result of deterioration over time. A decrease in luminescence over time regardless of specific cause of the deterioration will indicate that deterioration of the composition has occurred, indicating that it is time to reapply the composition, or repaint the surface.

In one such embodiment, the method includes one or more of the steps of: 1) applying a luminous composition that includes a liquid, which in an embodiment may be paint, and a luminescent material to a surface which may include a wall or floor; 2) determining an initial actual or expected luminescence of the luminous composition as applied to the surface; 3) after a period of time, which in some embodiments may be predetermined, determine a second luminescence of luminescent composition on the surface; 4) compare the initial luminescence to the second luminescence; 5) determine whether to reapply the luminous composition, or another composition, based on the comparison of the initial and second luminescence. In a variation of this method, rather than, or in addition to, comparing an initial luminescence to a later, second luminescence, luminescence of one portion of the surface may be compared to another portion of the surface to determine relative degrees of luminescence loss between different areas or portions of the surface at the same point in time, similar to methods associated with the luminous slip-resistant compositions described above.

The following clauses illustrate the subject matter described herein.

Clause 1. A luminescent slip-resistant composition for use on concrete surfaces that includes: a plurality of luminescent granules including a base granular material comprising one or more of silica, aluminum oxide and a granular polymer material, each granule coated with a luminescent material, an average size of the plurality of luminescent granules being in a range of 2 μm to 2,000 μm; and a liquid sealer. The plurality of luminescent granules are mixed into the liquid sealer to form the composition in a ratio of 2 ounces to 200 ounces of luminescent granules to one gallon of liquid sealer.

Clause 2. The luminescent slip-resistant composition of clause 1, wherein the luminescent material is a phosphorescent material.

Clause 3. The luminescent slip-resistant composition of clause 1, wherein the phosphorescent material comprises zinc sulfide or strontium aluminate.

Clause 4. The luminescent slip-resistant composition of clause 1, wherein the average size of the luminescent granules is about 500 μm.

Clause 5. The luminescent slip-resistant composition of clause 1, wherein the plurality of luminescent granules are mixed into the liquid sealer to form the composition in a ratio of 10 ounces to 50 ounces of luminescent granules to one gallon of liquid sealer.

Clause 6. The luminescent slip-resistant composition of clause 1, wherein the luminescent material exhibits a luminance be in a range of 4,000 to 8,000 mcd/$m^2$ (millicandelas per square meter) at 1 minute, 600-1,200 mcd/$m^2$ at 30 minutes and 100-300 mcd/$m^2$ at 1 hour.

Clause 7. A method for determining erosion and wear of a luminescent slip-resistant compound applied to a surface area that is adjacent to a water-containing structure that includes: observing a first level of luminance of a first portion of the surface area having the luminescent slip-resistant compound applied thereon; and observing a second level of luminance of a second portion of the surface area having the luminescent slip-resistant compound applied thereon; and determining that the second level of luminance is less than the first level of luminance, thereby determining that an amount of erosion and wear of the luminescent slip-resistant compound applied to the second portion of the surface area is greater than an amount of erosion and wear of the luminescent slip-resistant compound applied to the first portion of the surface area.

Clause 8. The method of clause 7, wherein observing a first level of luminance of the first portion of the surface area includes measuring a luminance of the luminescent slip-resistant compound applied to the first portion of the surface area.

Clause 9. The method of clause 8, wherein measuring the luminance includes using a luminometer to measure luminance, taking and analyzing photographs, or applying chemicals to the first portion of the surface area.

Clause 10. The method of clause 8, wherein the second portion of the surface area is a high-traffic area frequently trod on by persons and the first portion of the surface area is a low-traffic area trod on less often than the first portion of the surface area.

Clause 11. The method of clause 8, wherein determining that the second level of luminance is less than the first level of luminance includes comparing a measured level of luminance of the first portion of the surface area to a measured level of luminance of the second area.

Clause 12. A method for maintaining a surface area adjacent to a water feature. The method includes: applying a first coating of a luminescent slip-resistant compound to the surface area to form a luminescent slip-resistant surface area; subjecting the luminescent slip-resistant surface area to wear; identifying a portion of the luminescent slip-resistant surface area having an amount of luminance that is less than another portion of the luminescent slip-resistant surface area; and applying a second coating of a luminescent slip-resistant compound to at least the portion of the luminescent slip-resistant surface area having an amount of luminance that is less than another portion of the luminescent slip-resistant surface area.

Clause 13. The method of clause 12, wherein applying a first coating of the luminescent slip-resistant compound to the surface area to form a luminescent slip-resistant surface area includes applying a first coating of the luminescent slip-resistant compound that includes: a plurality of luminescent granules including a base granular material comprising one or more of silica, aluminum oxide and a granular polymer material, each granule coated with a luminescent material, an average size of the plurality of luminescent granules being in a range of 2 μm to 2,000 μm; and a liquid sealer. The plurality of luminescent granules are mixed into the liquid sealer to form the composition in a ratio of 2 ounces to 200 ounces of luminescent granules to one gallon of liquid sealer.

Clause 14. The method of clause 12, wherein identifying a portion of the luminescent slip-resistant surface area having an amount of luminance that is less than another portion of the luminescent slip-resistant surface area comprises measuring a luminance of each of the portions of the surface area.

Clause 15. The method of clause 14, wherein measuring the luminance includes using a luminometer to measure luminance, taking and analyzing photographs, or applying chemicals to the surface area.

Clause 16. The method of clause 12, further comprising measuring an initial luminance of the surface area prior to subjecting the surface area for wear, and comparing the initial luminance to a luminance of the surface area after subjecting the surface area for wear.

Clause 17. The method of clause 12, wherein identifying a portion of the luminescent slip-resistant surface area having an amount of luminance that is less than another portion of the luminescent slip-resistant surface area comprises comparing luminance of either or both of the portions of the luminescent slip-resistant surface to an initial luminance of the slip-resistant surface area prior to subjecting the surface area to wear.

Clause 18. A method that includes: providing a luminescent slip-resistant composition for use on concrete surfaces and providing a set of instructions for a user of the luminescent slip-resistant composition, the set of instructions describing multiple steps. The multiple steps include: applying the luminescent slip-resistant composition to a surface area to form a luminescent slip-resistant surface area; and identifying portions of the luminescent slip-resistant surface area exhibiting wear based on differences in luminance of the identified portions and luminance of other portions of the luminescent slip-resistant surface area.

Clause 19. The method of clause 18, wherein the luminescent slip-resistant composition comprises: a plurality of luminescent granules including a base granular material comprising one or more of silica, aluminum oxide and a granular polymer material, each granule coated with a luminescent material, an average size of the plurality of luminescent granules being in a range of 2 μm to 2,000 μm; and a liquid sealer. The plurality of luminescent granules are mixed into the liquid sealer to form the composition in a ratio of 2 ounces to 200 ounces of luminescent granules to one gallon of liquid sealer.

Clause 20. The method of clause 18, wherein the set of instructions further describes the step of reapplying the luminescent slip-resistant composition to the identified portions of the luminescent slip-resistant surface area exhibiting wear.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method for determining erosion and wear of a luminescent slip-resistant compound applied to a concrete surface area that is adjacent to a water-containing structure comprising:

applying the luminescent slip-resistant composition to a first portion of the concrete surface area and a second portion of the concrete surface area, the composition comprising a plurality of luminescent granules including a base granular material comprising one or more of silica, aluminum oxide and a granular polymer material, each granule coated with a luminescent material, an average size of the plurality of luminescent granules being in a range of 2 μm to 2,000 μm;

determining a first level of luminance of the first portion of the surface area having the luminescent slip-resistant compound applied thereon;

determining a second level of luminance of the second portion of the concrete surface area having the luminescent slip-resistant compound applied thereon; and determining that the second level of luminance is less than the first level of luminance, thereby determining that an amount of erosion and wear of the luminescent slip-resistant compound applied to the second portion of the concrete surface area is greater than an amount of erosion and wear of the luminescent slip-resistant compound applied to the first portion of the concrete surface area.

2. The method of claim 1, wherein determining a first level of luminance of the first portion of the concrete surface area includes measuring a luminance of the luminescent slip-resistant compound applied to the first portion of the concrete surface area.

3. The method of claim 2, wherein measuring the luminance includes using a luminometer to measure luminance, taking and analyzing photographs, or applying chemicals to the first portion of the concrete surface area.

4. The method of claim 2, wherein the second portion of the concrete surface area is a high-traffic area frequently trod on by persons and which demonstrates the greater amount of erosion and wear of the luminescent slip-resistant compound, and the first portion of the surface area is a low-traffic area trod on less often than the first portion of the concrete surface area and which demonstrates a lesser amount of erosion and wear of the luminescent slip-resistant compound as compared to the second portion.

5. The method of claim 2, wherein determining that the second level of luminance is less than the first level of luminance includes comparing a measured level of luminance of the first portion of the concrete surface area to a measured level of luminance of the second portion of the concrete surface area.

6. The method of claim 1, wherein applying the luminescent slip-resistant composition to a first portion of the concrete surface area and a second portion of the concrete surface area occurs prior to determining the first level of luminance of the first portion of the surface area having the luminescent slip-resistant compound applied thereon.

7. The method of claim 6, wherein applying the luminescent slip-resistant composition to a first portion of the concrete surface area and a second portion of the concrete surface area comprises applying an initial application of the luminescent slip-resistant composition prior to determining the first level of luminance of the first portion of the surface area having the luminescent slip-resistant compound applied thereon.

8. The method of claim 7, further comprising applying a subsequent application of the luminescent slip-resistant composition after determining that the second level of luminance is less than the first level of luminance.

9. The method of claim 1, further comprising applying a liquid sealer to the first and second portions of the concrete surface area.

10. The method of claim 9, wherein applying a liquid sealer to the first and second portions of the concrete surface area comprises mixing the plurality of luminescent granules into the liquid sealer to form the composition in a ratio of 2 ounces to 200 ounces of luminescent granules to one gallon of liquid sealer.

* * * * *